Dec. 1, 1931.  F. H. GIBBS  1,833,939
SHOCK ABSORBER
Filed Dec. 8, 1928
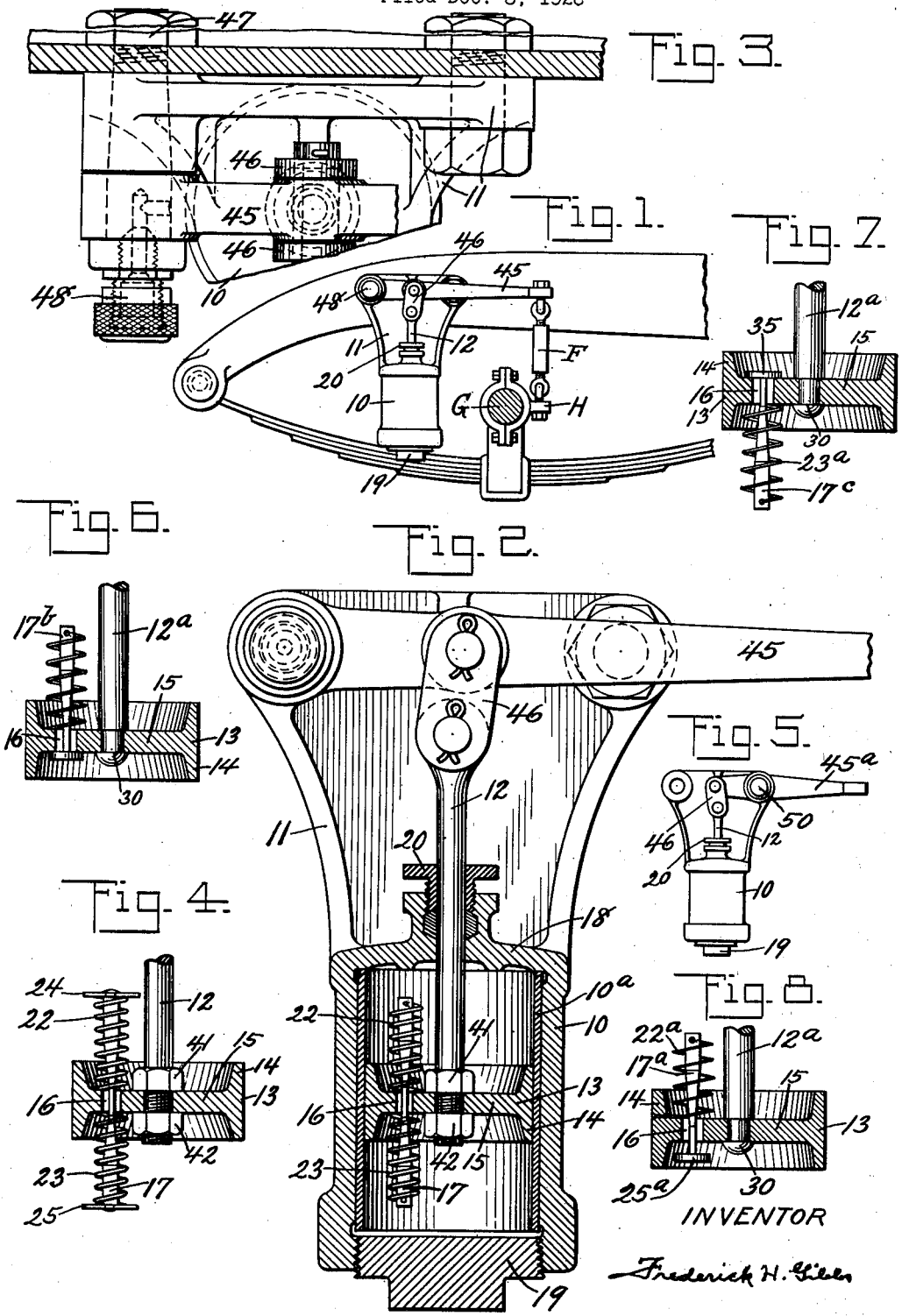
INVENTOR
Frederick H. Gibbs Patented Dec. 1, 1931

1,833,939

UNITED STATES PATENT OFFICE

FREDERICK H. GIBBS, OF BROOKLYN, NEW YORK

SHOCK ABSORBER

Application filed December 8, 1928. Serial No. 324,628.

This invention relates to shock absorbers especially adapted for use with motor vehicles and comprises broadly a cylinder adapted to contain a suitable fluid, preferably oil, with a single piston reciprocable therein, said piston being provided with, preferably, a single port and a single metering pin yieldingly carried by and partly in said piston so as to be capable of free rapid reciprocation in the cylinder, the piston carrying it, and the metering pin carried by the piston, being each freely movable independently of the other.

The invention includes means to check rapid movements of a vehicle body in a vertical direction either on compression or recoil of its supporting springs, at the same time providing a wide range of relatively zero resistance to the normal spring movement with a minimum number of parts.

The invention moreover provides in a single cylinder means to check excessive spring movement in either direction thereby providing a double acting shock absorber with a single cylinder or, by slight modification of a single part, a single acting shock absorber, as may be desired.

This invention bears no relation to that class of time-lag devices in which there are provided a plurality of pistons with interposed springs and a multitude of cooperating parts but is intended to present a solution of the problem of absorbing shocks in or to motor vehicles such as automobiles, buses, aeroplanes, etc., with a minimum number of parts and capable of quantity production at small cost. Wherefore applicant employs a single cylinder, a single piston, a single yieldingly maintained but freely movable metering pin with more or less conventional connecting means adapting such parts for connection with the body and axle or axles of vehicles and all preferably so arranged that the metering pin serves as a check to the flow of fluid through said piston near the end of its stroke in either direction while leaving the piston freely movable within a limited zone of relatively zero resistance, as when travelling over smooth roads.
The invention is illustrated in several modifications in the accompanying drawings in which the parts are designed for quantity production though it is to be understood that many modifications thereof are possible within the scope of the claims.
In the accompanying drawings forming a part of this application:

Figure 1 is a side elevational view of parts of a motor vehicle frame with the invention of the present application applied thereto;

Fig. 2 is a view partly in elevation and partly in vertical section illustrating the internal arrangement of the parts;

Fig. 3 is a plan view partly broken away illustrating the application of the invention shown in Fig. 1;

Fig. 4 is a modification;

Fig. 5 is a detached view showing a modified application of a control lever; and Figs. 6, 7 and 8 are modifications hereinafter more fully described.

Referring to the parts, it will be understood that the principal object of a shock absorber is to minimize shocks either on compression or rebound of vehicle springs, and to that end the shock absorbing mechanism is considered the most essential regardless of the particular method of attaching the same to a vehicle; hence the internal arrangement of the operative parts will be more fully described.

Referring to Fig. 2, in which the cylinder 10 is shown cast integral with the attaching bracket 11, it is to be noted that this type of connection may be employed, or any of the well known connections of a cylinder to or with a vehicle may be substituted therefor without departing from the spirit of the present invention which relates primarily to the operating cylinder, the parts positioned therein and means for operating said parts. Referring to such parts, a piston rod 12, which may be of conventional form, is employed, which piston rod in turn is connected with a piston 13 which may have an upper and lower flange as 14 or it may be of any conventional shape provided with a web portion 15 which in the present instance is perforated at 16 for the reception of a flow control means, in the present instance shown as a metering pin 17, which metering pin it is to be understood is necessarily of varying diameters between its ends. In Figs. 2 and 4 this metering pin is of minimum diameter for that portion which in the said figures is positioned in the port 16 and of gradually increasing diameter to a point near each end, from which point to the end said metering pin is of substantially the diameter of the port 16 though these dimensions may be slightly varied without departing from the spirit of the invention; the object of providing a metering pin being to furnish a tapered valve which will increasingly restrict the port 16 when the piston 13 approaches the end of its stroke at the top and bottom of the cylinder 10 or at either the top or the bottom of said cylinder, as may be desired, this depending to some extent upon the specific connection of the device to a vehicle frame and the type of leverage employed to actuate the piston 13. As shown in said Fig. 2, the cylinder 10 is provided with a top wall 18 and with a bottom wall 19, the latter comprising an ordinary commercial tapered plug 19 which may be readily removed when desired to permit access to the piston and its associated parts.

The upper wall of the cylinder 10 is perforated for the passage of the piston 12 and is provided with a packing gland 20 of conventional form. The metering pin 17 as shown in Fig. 2 is sustained in position by a pair of oppositely acting compression springs 22 and 23, respectively, bearing against the upper and lower faces of the web 15 of the piston and being connected with the metering pin 17 by being projected through a perforation near each end thereof so that in operation the springs are normally relieved of compression and free to move vertically in either direction upon contact with the inner faces of the top and bottom walls 18 and 19. A slight modification of this detail is shown in Fig. 4 in which, the other parts remaining the same, disks 24 and 25 are connected with the ends of the pin 17. A comparison of the details of Figs. 2 and 4 will show that there is little resistance to the passage of the pin 17 through the oil in cylinder 10; but with the same strength of spring the disks 24 and 25 offer some resistance which will cause a differential movement of the metering pin 17 of Fig. 4, which initial movement is lacking in Fig. 2, though with either construction when an end of the pin contacts with either the top or bottom wall of the cylinder the pin will be driven into the piston through the port thereof—assuming that the piston continues to move in the direction traveling when such contact is established. With a sufficiently strong spring, the disks 24 and 25 will perform no function in producing this differential movement, but with a sufficient increase in area of said disks and diminution in the strength of the springs 22 and 23 of Fig. 4 it will be observed that when the piston 13 is moved rapidly vertically of the cylinder 10 there will be a slight lag of the metering pin which will cause independent longitudinal movement thereof at less speed than that of the piston whereupon a thickened portion of the metering pin will enter the port 16 thus tending to retard, though not stop, the movement of said piston. Due to the cross sectional area of the port 16, compared with the cross sectional area of the portion of the pin 17 normally resting in said port, it will be obvious that during slow movement of the piston of either Fig. 2 or Fig. 4 there would be a free passage for fluid from one side of the piston to the other; thus the parts will accommodate themselves to a load imposed upon the springs and maintain the piston and the metering pin in what may be termed zero relation; that is, the parts will be so held that, regardless of whether the piston moves in one direction or the other, there will be relatively no resistance to such movement caused by the metering pin and thus a zone of zero resistance is established which will follow the piston up or down during all slow movements thereof until a point is established where the metering pin will contact with a fixed abutment within the cylinder. Obviously, an artificial abutment may be provided; but for convenience of production the top and bottom walls of the cylinder are intended to be employed for this purpose.

This zone of zero resistance is maintained in the modification shown in Fig. 8 in which a piston rod 12a is shown connected with the piston 13 by upsetting the end of said rod as shown at 30. In this modification a metering pin 17a is employed which is supported by a tension spring 22a connected with the upper end of said metering pin as shown in Fig. 8 and projected through a perforation in the upper flange 14 of the piston at its opposite end whereby the metering pin is maintained normally in position as shown in said Fig. 8 with the port 16 normally open. With this construction, it is obvious that a sudden upward movement of the piston 13 will cause slight compression of the spring 22a and permit a thickened portion of the metering pin 17a to enter said port. This will be caused by the flow of fluid through said port impinging the disk valve 25a. Upon a down stroke of the piston 13 of Fig. 8, if the stroke is rapid, the valve disk 25a will close the port 16; but if the movement of the piston is sluggish, said port 16 will remain open, permitting the piston to descend without resistance. If the piston descends with excessive speed, the resistance of the disk 25a will cause said disk to rise relative to the piston port and close said port during continued downward movement of the piston. Except for the zone of zero resistance, the modification of Fig. 6 is like that of Fig. 8 and it is to be noted that with either modification, when the piston rises to proper level in the cylinder, the upper end of the metering pins 17a or 17b will contact with the top wall of the cylinder and force an enlarged portion of the pin into and partly close the port 16 of the piston. With the modification shown in Fig. 7, the reverse is true, and during downward movement of the piston 13, upon slow movement, the valve 35 will be opened against the pressure of the spring 23a until such time as the bottom of the metering pin 17c will contact with the bottom of the cylinder, whereupon the port 16 of Fig. 7 will be wholly or partly closed, depending upon the maximum diameter of that part of the pin 17c which will enter said port.

Preferably, if the piston rod is sufficiently long, the manner of connecting the same with the piston shown in Figs. 6, 7 and 8 will be employed; but if a shorter piston rod is desired, the type of connection shown in Fig. 2 may be employed, in which nuts 41 and 42 screw-threadedly engage the piston rod at opposite sides of the web 15 of the piston thereby securing the same upon the lower end of the piston rod. Instead of using the conventional rock shaft and rocker arm commonly employed for actuating the piston rod of vehicle shock absorbers, the type of connection illustrated in Figs. 1 and 2 may be employed in which the actuating arm 45 has connected with it the link 46 which in turn is connected with the upper end of the piston rod 12, the actuating arm 45 being supported upon a stud 47 which may be one of the bolts employed to connect the shock absorber assembly with the vehicle frame. If this is employed, a grease cup as 48 may be used to force grease to the bearing of said stud 47; thus the means for securing the shock absorber to the frame may be employed as a support for the actuating lever. This is slightly modified in Fig. 5 in which a stud 50 may serve as the pivot for the control lever 45a, if desired.

In Fig. 2, the cylinder 10 is shown equipped with a cylindrical liner 10a which may be employed, if desired, though preferably only where the cylinder is a rough casting. If the liner is employed, it is preferably formed of steel tubing, which may be obtained in the open market and which can be used without machining.

No filling plug is shown in the drawings, though it is understood that such device is common in the art and will be employed under normal conditions for refilling the cylinder tank if it becomes necessary in service, the cylinder being commonly filled with a fluid not subject to extreme changes of viscosity with changes of temperature.

It is understood that the actuating arm is connected in a suitable manner with the vehicle axle and for the purpose of providing suitable adjustment this is established by means of the turnbuckle F connected by means of the shackle H with the axle G, as shown in Fig. 1.

While the preferred form of the invention has been shown and described, it is to be understood that the invention is not limited to the exact details of construction shown and described as it is obvious that various modifications thereof within the scope of the appended claims will occur to persons skilled in the art.

What is claimed is:

1. In a shock absorber, a cylinder, a piston reciprocable therein, a yieldingly mounted metering pin carried by said piston and adapted to contact with a relatively fixed abutment whereby it is held stationary relative to the cylinder during a portion of the movement of the piston.

2. In a single-cylinder double-acting shock absorber, a compartment adapted for attachment to a vehicle chassis, a cylinder formed integral therewith and providing a stop near its upper and its lower end, a piston rod, a single piston and a metering pin paralleling said piston rod and yieldingly carried by said piston and adapted to contact with said stops near the ends of the strokes of the piston whereby continued movement of the piston is relative to the pin.

3. In a shock absorber, a cylinder, an abutment therein, a ported-piston movable in the cylinder, a metering pin carried by and movable independently of the piston and adapted to contact with the abutment to cause maximum closure of a piston port near each end of a piston stroke.

4. In a shock absorber, a compression cylinder, a ported pressure piston therein, a metering pin in a port of said piston with its zone of least diameter normally arranged in the port to normally permit a substantially unrestricted flow of fluid therethrough, the pin being of less length than the cylinder and adapted to be moved into contact with a fixed end wall thereof to cause maximum closure of said port.

5. In a shock absorber, a piston having a port therein, and a metering pin yieldably supported by the piston with its ends projecting a substantial distance beyond the piston and having its smallest effective diameter intermediate its ends and arranged in said port.

6. In a shock absorber, a cylinder having a fixed abutment, a piston reciprocable in the cylinder and provided with a port, a tapered metering pin extended through the piston with its zone of least diameter normally arranged in said port, resilient means for supporting the metering pin, the latter being adapted to contact with a fixed abutment after partial movement of the piston in one direction.

7. In a shock absorber, a cylinder having a fixed abutment, a piston reciprocable in the cylinder and provided with a port, a tapered metering pin extended through the piston with its zone of least diameter intermediate its ends normally arranged in said port, resilient means for supporting the metering pin, the latter being adapted to contact with a fixed abutment after partial movement of the piston in one direction.

8. In a shock absorber, means adapted for connection thereof with a vehicle frame, a cylinder integral with the connecting means and provided with a cover and a fixed abutment, a rock shaft supported by the connecting means, a piston rod connected with the rock shaft and extending through the cover to be guided thereby, a piston movable by the said rod and provided with a port, and a metering pin yieldably supported by the piston and having a portion of least effective diameter normally arranged in the port and having at least one enlarged end projecting beyond the piston to contact with the fixed abutment near the end of the piston stroke whereby to restrict the port.

9. In a shock absorber, a cylinder, a piston reciprocable therein and having a port, and a metering pin yieldably supported by the piston and having a zone of least effective diameter intermediate its ends arranged in said port, the ends of said pin being gradually reduced towards said zone of least diameter.

10. In a shock absorber, a cylinder, a piston reciprocable therein and having a port, and means for cushioning the piston towards the ends of its strokes comprising a metering pin gradually reduced in diameter from near each end to a zone of least effective diameter, said pin being yieldably supported by the piston with the zone of least effective diameter normally arranged in said port.

11. In a shock absorber for vehicles, a body of fluid, a container for the fluid, a reciprocable piston in said container provided with an opening permitting substantially unresisted movement of the fluid for a portion of its stroke, and flow controlling means yieldably carried by the piston in the opening adapted to be forced into contact with the container to be held stationary near the end of the stroke of the piston in each direction; for graduating the resistance of fluid flow through the opening successively in accordance with different positions of the piston.

12. In a shock absorber, a fluid holding cylinder, a piston therein provided with a port, a yieldingly mounted element carried by the piston in the port and normally restricting the latter but permitting flow of fluid therethrough, said element being adapted to contact with an abutment as the piston approaches the end of its stroke whereby said piston moves relative to said element.

13. In a shock absorber, a fluid holding cylinder, a piston therein provided with a port, a yieldingly mounted element carried by the piston in the port and normally restricting the latter but permitting flow of fluid therethrough, said element being adapted to contact with an abutment as the piston approaches the end of its stroke whereby said piston moves relative to said element, and the latter increasingly restricts the port to vary the flow of fluid therethrough.

14. In a shock absorber, a fluid holding cylinder, a piston therein provided with a port, a yieldingly mounted element carried by the piston and arranged in the port and normally restricting said port but permitting flow of fluid therethrough, and an abutment arranged in the path of travel of the element and with which said element contacts during a portion of the movement of the piston whereby the element is held stationary with respect to the moving piston.

15. In a shock absorber, a fluid holding cylinder, a piston therein provided with a port, a yieldingly mounted element carried by the piston and arranged in the port and normally restricting said port but permitting flow of fluid therethrough, and an abutment arranged in the path of travel of the element and with which said element contacts during a portion of the movement of the piston whereby the element is held stationary with respect to the moving piston and said element increasingly restricts the port to vary the flow of fluid therethrough.

16. In a shock absorber, a compression cylinder, a ported pressure piston therein, a metering pin resiliently supported in a port of said piston, the pin being of less length than the cylinder and adapted to be moved into contact with the fixed end walls thereof whereby continued movement of the piston in both directions will cause a gradual closure of said port.

17. In a shock absorber, a housing providing a fluid holding cylinder, a piston in said cylinder and including a piston rod secured thereto, said piston having a fluid passage therethrough, a flow control device in said passage normally maintained in a definite relation with respect to the passage for permitting a definite rate of flow of fluid through said passage, and means with which said flow control device contacts near the end of the piston stroke to effect relative movement between the piston and flow control device whereby to vary the rate of flow through the fluid passage.

18. In a shock absorber, a cylinder, a piston reciprocable therein provided with a port, a yieldingly mounted metering pin carried by the piston in the port adapted to contact with a wall of the cylinder during a portion of the stroke of the piston whereby continued movement of the piston is relative to the pin and the latter progressively increases the restriction of the port.

19. In a shock absorber, a fluid holding cylinder, a piston therein having a port, and means for controlling passage of fluid through the port comprising a metering pin resiliently supported by the piston with its zone of least diameter arranged in the port, a head on one end of said pin for closing the port against passage of fluid when the piston moves in one direction, the opposite end of said pin being adapted to contact with the adjacent end wall of the cylinder near the end of the stroke of the piston in the opposite direction to progressively increase the restriction of the port.

20. In a shock absorber, a fluid holding cylinder, a piston therein having a port, and means for controlling passage of fluid through said port comprising a pin yieldably supported by the piston in the port with one end projecting a substantial distance beyond the piston, the other end of said pin being of reduced diameter and arranged in the port, and a valve head secured to the reduced end of the pin.

21. In a shock absorber, a fluid holding cylinder, a piston therein having a port, and means in said port for controlling passage of fluid therethrough comprising a metering pin resiliently supported by the piston with its zone of least diameter normally arranged in the port, and a head at each end of said pin.

22. In a single-cylinder double-acting shock absorber, a single ported-piston reciprocable in said cylinder, and a yieldably supported metering pin in said piston having its ends above and below the piston for contacting with fixed abutments near either end of the piston stroke whereby said pin is maintained stationary with respect to the cylinder near the end of the stroke of the piston to restrict the piston port.

23. In a shock absorber, a cylinder, an abutment therein, a ported piston movable in the cylinder, a metering pin in the piston port normally maintained in a definite relation with respect to said port for permitting a definite rate of flow of fluid through said port; said pin being adapted to contact with said abutment near the end of the piston stroke, the piston being movable independently of the pin after the latter has made contact with the abutment whereby to cause increasing closure of the piston port.

24. In a shock absorber, a fluid holding cylinder, a piston movable therein and having a fluid passage, a metering pin yieldingly connected to the piston and arranged with its zone of least diameter positioned in the fluid passage, and means in said cylinder with which the metering pin contacts upon abnormal movements thereof for causing progressively increasing closure of the fluid passage near the end of the piston strokes.

25. In a shock absorber, a housing providing a fluid holding cylinder, a piston in said cylinder and including a piston rod secured thereto and positioned and guided wholly therein, said piston having a fluid passage, flow control means in said passage normally maintained in substantially a definite relation with respect to the passage and permitting a definite rate of flow of fluid through the passage, and an abutment in said cylinder with which the flow control means contacts during the movement of the piston for causing relative movement between the piston and flow control means near the end of the piston stroke to vary the rate of flow through said fluid passage.

26. In a shock absorber, a housing providing a fluid holding cylinder, a solid piston therein having a fluid passage connecting opposite ends of the cylinder, flow restricting means in said fluid passage normally maintained in substantially a definite relation with respect to the fluid passage for permitting a definite rate of flow of liquid through the passage, and means for maintaining said flow restricting means stationary relative to the cylinder near the end of the stroke of the piston to vary the rate of flow through said passage.

In witness whereof I have hereunto set my hand.

FREDERICK H. GIBBS.